Sept. 5, 1967   R. J. SHERMAN ETAL   3,340,224
THERMOSETTING, CURABLE ELASTOMERIC COMPOSITION, AND
METHODS OF MAKING THE SAME
Filed Jan. 21, 1965

INVENTORS
Robert J. Sherman
Richard H. Toth
BY
Harness & Harris
ATTORNEYS

United States Patent Office 3,340,224
Patented Sept. 5, 1967

3,340,224
THERMOSETTING, CURABLE ELASTOMERIC
COMPOSITION AND METHODS OF MAKING
THE SAME
Robert J. Sherman, Detroit, Mich., and Richard H. Toth,
Port Clinton, Ohio, assignors to Chrysler Corporation,
Highland Park, Mich., a corporation of Delaware
Filed Jan. 21, 1965, Ser. No. 428,612
22 Claims. (Cl. 260—41.5)

The present application is a continuation-in-part of our copending application Ser. No. 779,799, filed Sept. 30, 1958, now abandoned.

This invention relates to improved thermosetting and catalytically curable elastomeric materials and to compositions of this character in their intermediate or partially cured stage (hereinafter sometimes referred to as the B stage) and also in their finally cured stage (hereinafter sometimes referred to as the C stage), to methods of making, curing and using the same, and to composite structures comprising or utilizing the same. By B stage we mean that condition of the composition where some but before all of the active molecules are cross linked and the composition is still softened by heat, that is to say, is semi-thermoplastic.

By C stage we mean that condition where the composition has substantially reached the final stage of polymerization where cross linking becomes general and the composition assumes a thermoset, is substantially insoluble and infusible but is still elastomeric.

The invention especially concerns the aforesaid intermediate stage compositions (B stage) in non-sticky, extruded or preformed shapes for use as bonding and fluid sealing laminae or mediums between adjacent layers of glass or metal or both, which layers it will preferably adhesively wet and bond during cure to the C stage by catalyst or by heat in which event the composition passes through a thermoplastic condition evidenced by strong adhesiveness. It further relates to materials and compositions of the aforesaid character in the aforesaid intermediate cured stage in trowelable form and which may be tacky in character and have immediate adhesive wetting properties in the intermediate cured stage (B stage) and which may subsequently be finally cured (C stage). In either case the resulting cured product is a shock absorbing resilient elastomer having strong adhesive bonding characteristics. The invention also concerns the preparation, character and form of the synthetic plastic ingredients for use in the foregoing compositions or materials and of the latter.

The materials of our invention have particular application as satisfactory adhesive bonding and sealing media between structural members having different coefficients of expansion and, therefore, different relative changes in dimensions by thermal expansion or contraction for a given temperature change. The compressive and expansive forces developed by each of these members and normally transmitted to each other member when rigid bonding mediums are employed are ofttimes great enough to break or shatter one or all of said members particularly when one or all of said members is glass or other brittle material. The present invention eliminates the possibility of the transmission of such compressive or expansive forces from one member to another by providing between them in C stage condition an elastomeric, force absorbing, strongly adherent bonding medium between these members. Any differences in the magnitude or direction of the compressive and expansive forces developed by these members are transmitted to the elastomeric, bonding medium wherein they are absorbed in causing said medium to stretch, compress, shear, or otherwise deform.

Our invention will be particularly described in relation to window constructions especially for automotive and domestic use wherein a glass panel or sheet is to be structurally carried in and strongly bonded to a metallic channel member partially or wholly framing the same. Our invention finds particular utility as non-tacky extruded channels or sheeted bonding mediums for use in window structures wherein water-tight seals are required and partial framing of the glass is desirable. However, it will be understood that our invention is not limited thereto but has broad application as mentioned above.

Our invention further finds special application in permanently and securely bonding glass to the metal frames of movable windows such as the side windows of convertibles, hardtops, and the rear window of station wagons. In these window assemblies the application of the present invention eliminates the necessity of the conventionally used metal brackets and screws required to hold the window into tight and sealing engagement with the metal frame by drawing the frame into tight engagement with the window around the periphery of the window, in a manner that the glass itself may serve as a structural member in the assembly and bear a load normally borne by metal members.

Heretofore, liquid adhesives of various types have been used for effecting a bond between glass panels and channel frames but have not proven satisfactory in that the adhesives when cured or dried showed substantial shrinkage and became hard and brittle, usually pulling away from either the sides of the channel or the glass thereby weakening the bond and allowing the glass to loosen and break its watertight seal with the channel. Other adhesives have been employed which do not shrink but invariably cure or set to such a rigid state when used as a bond between a metal channel and a glass panel that they act to transfer stresses from the metal to the glass during periods of thermal expansion or contraction of the glass and the metal in the temperature range of −40° F. to 375° F. or by mechanical working of the metal causing the glass to be overstressed and to shatter due to the fact that the rigidly cured or set adhesives do not have the capacity to buffer or absorb the forces created by said thermal expansion or contraction or mechanical working. It has also been attempted to use other sealing and securing means such as, for example, sheet asbestos and hard pre-cured rubber compressed and wedged tightly into a metal channel on either side of the glass to form a frictional bond and seal. However, this procedure has often caused glass breakage during assembly and has not been conducive to perfect fluid tight seals. Moreover, where the inherent friction has been great due to imperfection in the glass or metal such has contributed to excessive stressing and shattering of the glass during periods of wide ambient temperature fluctuations. Furthermore, the asbestos and rubber heretofore used tend to age and shrink away from the metal and glass to deteriorate the seal and bond It is the general object of our invention to avoid the foregoing disadvantages of known adhesive and frictional type bonds between parts of laminated structures, particularly those comprising juxtaposed layers of metal and brittle material, by providing a layer of an improved type of thermosetting elastomeric composition between such materials which when cured to the C stage securely and adhesively bond the same and provide a satisfactory seal and stress buffer and which composition may be heat cured or cured without extraneous heat by a suitable catalyst, to provide a watertight adherent bond having such substantial resilience and shock absorbing properties permitting substantial stressing and elastic deformation thereof that fracture of the brittle parts of the structure or destruction of the bond or shift between layers of the laminated structure will not occur even after extensive exposure to all required weather and climatic conditions and wide temperature fluctuations of between −40° F. to 375° F.

The elastomeric materials of our invention moreover find wide utility in the intermediate cured stage (B stage), in liquid and tacky form, and especially in nontacky extruded or sheeted form as a bonding and stress buffering medium for many materials such as ceramics, wood, low temperature refractories, metals, synthetic and natural plastics and fibrous material, and especially in liquid tacky form as an ingredient of waterproofing compounds and composite waterproofing materials.

Another object is to provide an elastomeric, shock absorbing bonding medium for permanently securing together without fracture on exposure to varying thermal conditions, fragile structures having widely different coefficients of expansion.

A further object is to provide an improved type of shock absorbing bond and fracture inhibiting bond between structural elements one of which is of a fragile or refractory character.

A specific object is to provide a resilient adhesive material for bonding metal to glass which in its cured state protects the glass from shatter due to thermal shock caused by the relative movement of the metal and glass.

A particular object is to provide a B stage cured thermosetting elastomeric structural bonding composition for effecting a bond between structural or decorative parts

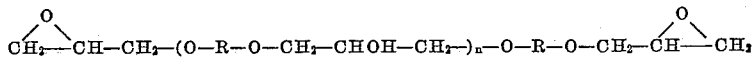

which composition consists essentially of rubber, resin, and a resin curing agent and which composition is shape formable by extrusion or rolling and may be cured to its C stage to a resilient, waterproof, adherent condition at a temperature above that essentially obtained during forming but at a temperature below that apt to injure the parts being bonded.

Another object is to provide an improved method of applying semi-cured (B stage) adhesive or bonding material between glass panels and metal parts such as metal channels, to provide a structural bond therebetween when fully cured (C stage) capable of protecting the glass from shatter due to stress transfer between the glass and metal during temperature changes of between −40° F. to 375° F., and providing a watertight seal between the glass and the metal part.

Other objects and advantages of our invention will appear from the following description and drawings referred to therein.

The composition of our invention in its uncured state comprises essentially an intimate mixture of a rubber-like constituent, a curable resin constituent and a resin curing agent or activator. The rubber-like material may be one or a mixture of synthetic buna N rubbers (also called GR–A and GRN rubbers) commercially known as "Perbunan," "Hycar," "Chemigum," "Thiokol RD," and "Butaprene" comprising copolymers of acrylonitrile and butadiene in which the acrylonitrile content will vary between about 18 to 50% by weight and polymers of an acrylic acid ester, for instance, a copolymer of acrylic acid and ethyl acetate, which copolymers and polymers as will hereinafter be apparent, may be employed in a wide range of proportions with respect to the resin to give to the compounded intermediate cured (B stage) material the desired viscosity, wetting characteristics, shelf like, tackiness and non-tackiness, and to give to the finally cured (C stage) material the desired properties of resiliency, elasticity, adhesion, and shock absorption. Except for minor amounts required as vehicles for certain catalysts the composition is preferably free of solvents to avoid substantial stickiness in the B stage of cure and a weak porous structure in the C stage.

Specific examples of suitable rubbers for compounding with epoxy resins in particular are the butadiene-acrylonitrile copolymers such a "Hycars" 1001, 1002, 1014, 1041, 1042, 1312, and the acrylic ester copolymer "Hycar" 4021 (copolymer of ethyl acrylate and chloroehtyl vinyl ether, which is a copolymer of ethyl acrylate and chloroethyl vinyl ether having a chloroethyl vinyl ether content of more than 2 percent and less than 10 percent by weight, all produced by B. F. Goodrich Company). However, the preferred rubbers for obtaining the aforesaid desirable properties of the intermediate and fully cured elastomeric bonding medium are the high acrylonitrile rubber such as "Hycar" 1041 and 1043 having an acrylonitrile content of about 43% and 28% respectively. Specific proportions of one or a mixture of these and/or other aforementioned rubbers within wide ranges may be compounded with the resin to give desirable properties. Other elastomers finding utility in the present invention particularly as plasticizers and modifying agents are "Neoprene" (polymers of chloroprene), "Hypalon" (DuPont) chlorosulfonated polyeethylene, carboxylated rubbers, "Viton" (DuPont) a copolymer of vinylidene fluoride and hexafluoropropylene, polyurethanes, and polysulfides.

The resin employed in our novel composition as the major resin constituent is an epoxy type resin or polyglycidal ether of the general formula:

wherein $n$ stands for a number (such as 1, 2, 3, etc.) and R stands for the hydrocarbon radical of a polyhydroxy organic compound such as bisphenol, for example, of bis-(4-hydroxyphenyl)-2,2-propane, which is

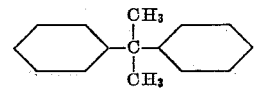

preferably comprising the reaction product or a mixture of reaction products of epichlorohydrin and a polyhydroxy organic compound selected from bis-, tris-, and tetrakis-glycidal ethers such as bisphenol A, chemically described as 4,4'-isopropylidenediphenol or 2,2-bis (4-hydroxyphenyl) - propane or bis-(4-hydroxyphenyl)-2,2-propane, or such compounds as 1,3-dihydroxybenzene, 1, 3,5 - trihydroxybenzene, 1,5 - dihydroxynaphthalene, 2,2-3,5-tetrakis (4-hydroxyphenyl) hexane, and ethylene glycol.

A commercial example of an epoxy resin made by reacting epichlorohydrin and bisphenol A (which is the reaction product of phenol and acetone under acid conditions) is that produced by the Shell Chemical Company under the name "Epon 828." "Epon 8228" is a lower molecular weight resin of the so-called commercial "Epon" epoxy resins which are condensation polymers of epichlorohydrin and bisphenol A and so described at page 436 of the Condensed Chemical Dictionary, 1956 Edition (Reinhold Publishing Corp). As further described at page 20 of Chapter 1 of the publication "Epoxy Resins" by Lee and Neville (1957), McGraw Hill Book Company Inc., "Epon 828" has an average molecular weight of between 350–400, an epoxide equivalency of 175 to 210[1] and is liquid at room temperature.

Although not preferred, other types of modifying resins may be incorporated in convenient form (powder, plastic, or fluid) into the composition, as additions to the epoxy resin, during its compounding in the mixers and mills to facilitate working the material and to impart other desirable physical properties to the composition in the finally cured state. They should not be the major resin constituent

---

[1] Epoxy equivalent is the weight of resin in grams which contains one gram chemical equivalent of epoxy.

and should not be used in amounts which will adversely effect the important properties described above required in the present invention. An amount less than 25% by weight of the total resin content is preferred.

These resins include the alkyds, substituted alkyds, vinyl alkyds, unsaturated alkyds, acrylics, polysiloxanes, silicones, phenolics, modified phenolics, phenol-formaldehyde, cellulose nitrate, shellacs, caseins, cumar resins, cumarone indene resins, indene resins, vinyl acetate polymers, phenolfurfural, aniline formaldehyde, cellulose acetate, thiourea formaldehyde, urea formaldehyde, vinyl chloride-acetate polymer, acrylic esters, methacrylic esters, polybutene, benzyl cellulose, ethyl cellulose, polystyrene, polyamides, vinylidene chloride, melamine-formaldehyde, polyethylene, tetrafluoroethylene, polyesters cross linked, plastisols and organisols, and diallyl benzene phosphonate. The particular modifying resin or combination thereof used is determined by the particular compounding equipment and the desired shape and physical characteristics of the intermediate and finally cured material.

Plasticizers conventionally used in the compounding of buna N rubber may also be compounded into the adhesive formulations presented herein. These plasticizers are preferably of the polar type organic compounds which include esters, ethers, alcohols, alcohol amines, aldehydes, ketones, acids and their polar derivatives.

The epoxy resin curing agent found to give the most desirable results is N,N diallylmelamine. This compound is a crystalline solid that melts at about 288° F. It has the critical and desirable property of reacting and going into solution with the liquid epoxy resin at a temperature above about 200° F. and actively between about 240–245° F. It facilitates working and blending for the required time and without scorching of all of the constituents of the rubber composition including this compound at this and higher temperatures, for example, at temperatures and times normal to rubber processing, i.e., 250–270° F. for about 8 minutes. In this processing the N,N diallylmelamine dissolves into the liquid epoxy resin and limits cure of the epoxy resin to the B stage of cure in which condition the rubber composition of the invention reverts from a tacky to a substantially non-tacky condition such that it may be calendered or extruded into shaped products for subsequent use. In attaining the B stage of cure the epoxy resin of the composition has progressed from the viscosity of approximately 6000 centipoises at room temperature to 75,000–125,000 centipoises at room temperature. Moreover, the calendered or extruded product is substantially free of any scorching, substantially non-tacky and may thereafter be heated to temperatures up to about 325 to 350° F. for about 20 to 30 minutes to effect optimum curing of the rubber and resin to the C stage of the latter without scorching, during which transition the epoxy resin provides the composition of the invention with strong adhesive wetting and elastomeric properties for effecting a bond with structures with which it is in contact, for example, metal and glass and which inhibits shatter of the glass due to stress transfer between the glass and metal at temperatures between about —40° F. to 375° F. by substantial absorption of any stress. The strength of the bond is evident by shear tests showing a value of 325–700 p.s.i. Moreover, the cured material is resilient and has a hardness of about 80 to 90 Shore durometer A scale at room temperature. The use of curing temperatures above 350° F. with this curing agent tends to produce scorching of the composition with resulting poor long time aging characteristics.

Other agents which have been investigated and show favorable reactions for certain applications where stress transfer is not a factor and hard inelastic cured products are not objectionable are triazine triamine actively curing at 425° F. and above, and the acid salts thereof actively curing at 250–320° F., alkyl (mono-di-tri-tetra) substituted triazine triamines and their acid salts, cyanoethylated alkyl amines such as a cyanoethylated diethylene triamine and their acid salts, acid salts of primary, secondary, and tertiary amines, and cyanoethylated alkyl substituted triazine triamines and their acid salts. In using these agents the rubber composition usually remains tacky after blending and presents problems where calendering is desired. N,N' diallylmelamine and unsaturated alkyl and polyalkyl derivatives of melamine may also be used but require cure temperatures above 375° F. Boron trifluoride ether complexes may be used in conjunction with the above curing agents to modify such properties as cure rates but it has the further effect of limiting shelf stability of the end product. Moreover, the above mentioned salts may be salts of mineral as well as carboxylic acids.

Wherein a given application using any of the above compositions a surface cure is adequate, a room temperature cure is feasible, where suitable catalysts such as diethylene triamine and polyamides are applied to the surfaces of these materials in solution form shortly before preparing the assemblies to cure the resin at room temperature. The extent of such cure will be dependent on the ability of the catalyst to migrate into the composition.

Generally speaking, any suitable means may be used in effecting copolymerization of the N,N diallylmelamine with the epoxy polymer. Heat, light, or both heat and light, with or without a polymerization catalyst can be used. Among the catalysts which may be employed are the inorganic peroxides, e.g. hydrogen peroxide, lead peroxide, barium peroxide, magnesium peroxide, etc., and the organic peroxides such as diethyl peroxide, dipropyl peroxide, etc. Care must be exercised in the use of these peroxides since very rapid resin cures may be obtained thereby.

Solvents which can function as vehicles for these catalysts and not interfere appreciably with the cure of the structural adhesive or the structural bond formed may be selected on a basis of compatibility with the particular formulation which is used within the above composition. However, solvents are neither required nor desired.

In compounding the composition, the rubber stock alone is preferably compounded with the resin and resin curing agent in cold tight mill rolls, preferably along with suitable known anti-oxidants such as polymerized trimethyl-dihydroquinoline, hydroquinone monobenzyl ether, and P (P-toluene sulfonylamido) diphenylamine, with accelerators such as the "Zimates" (e.g. zinc dibutyl dithiocarbamate), "Tuads" (e.g. tetra alkyl thiuram disulfide), "Selenates" (e.g. selenium dialkyl dithiocarbamate), "Altax" (e.g. benzothiazyl disulfide), "Captax" (e.g. mercaptobenzo thiazole) made by R. T. Vanderbilt Co., and "Monex" (e.g. tetramethylthiurammonosulfide) made by Naugatuck Chemical, with a vulcanizing agent such as sulfur and zinc oxide, with suitable fillers and reinforcing material such as china clay, asbestos fiber, cotton flocks, synthetic flocks, ground mica, powdered graphite, carbon black, and slate dust, and with plasticizers such as described above. This compounding operation normally creates considerable heat due to the friction of the rolls and the resistance of the rubber to shearing, and the particular resin curing agent employed must have an active reaction or curing temperature with the resin either above or in the highest temperature range developed by the compounding operation (in the latter where a short time exposure is feasible), since uncontrolled cross linking or curing of the resin in the mill would render it unsuitable for subsequent use as a strip adhesive or as an extrudable material. The aforementioned N,N diallylmelamine appears to be the bond producing curing agent most suitable for use when preparing the composition in this manner, since the practical or active curing temperature range thereof is between 250° F.–320° F. This temperature curing range in part overlaps the temperatures of 250° F. to 270° F. developed in the composition during compounding normal to rubber processing and is for the greater part above this range. At the lower end the rate of cure is slow but adequate to advance the resin to the B stage. The N,N diallylmelamine facilitates close controlled compounding and curing of the composition. It allows the amine to be dissolved in the resin in the normal rubber compounding operation. It enables a partial cure of the epoxy resin to the B stage of cure in compounding the composition and without advancing such cure to the C stage and it facilitates rendition of the rubber composition to a substantially non-tacky condition thus making possible a composition which may be made into a calendered or extruded thermosettable product of desired physical properties which may subsequently be cured to the C stage, for instance, by further heating in the normal curing range and at higher temperatures avoiding scorching. N,N diallylmelamine and other melamines may conveniently be produced by the methods disclosed in Patents No. 2,361,823, No. 2,481,758, and in Beilstein No. 26,251. Moreover, the viscosity of compositions or blends containing N,N diallylmelamine may be controlled to suit specific structural applications. For example, by heating the composition in a controlled manner to about 290° F. in the mill for a limited time during the compounding operation, and preferably in the range 250 to 270° F. the viscosity will become increased through controlled curing (B stage) sufficiently to allow the blend to be properly extruded or sheeted at a lower temperature (120 to 170° F.) to a specific shape of specific dimensional tolerances while still in the B stage condition thereby permitting the adhesive bonding characteristics of the formed product to remain unimpaired until such time as the final cure of the composition to the C stage is obtained by heating at temperatures within the normal curing range of 250° F.–320° F. and up to 350° F. for sufficient time (for example, 5 to 15 minutes at 320° F., and 30 minutes at 250° F.) to create a strong adhesive resilient bond.

A typical general formulation to cover the entire usable range of various structural rubber adhesives which may be prepared from the above raw materials is as follows:

*Example No. 1*

Raw materials: Composition range, parts by weight
Buna-N rubber (including conventional curing agents and accelerators) _____ 5–100
Fillers, reinforcing agents, pigments and/or physical property modifiers _____ 0–200
Epoxide resins _____ 100–5
N,N diallylmelamine [1] _____ 15–0.8
Additives (anti-oxidants, retarders) _____ 0–10

[1] Quantity sufficient to react with all epoxide groups present in the epoxide resin.

Products may be formulated within this general composition range which will exhibit in the intermediate cured stage viscous liquid or rubber-like characteristics and will have in the finally cured condition, i.e. finally cured resin and rubber system, a wide range of strength, flexibility and adhesive properties separately and when bonded to such materials as glass, metals, metal oxide surfaces and polar organic and inorganic surfaces in general. Generally speaking, a reduction of the epoxide resin content and a proportionate reduction in the content of the curing agent will reduce the tensile strength of the bond. When the amounts of resin and curing agent become low enough the comparatively weak bonding character of the buna-N rubber dominates the system.

These products have been particularly investigated in the tape or sheet, extruded, and viscous liquid forms, as thermosettable adhesives for bonding glass to metal and metal oxide surfaces and were found to exhibit desirable initial and aged adhesion characteristics and desirable shelf life which is, generally speaking, difficult to obtain when using the conventional amine curing agents for curing the epoxy resin. For example, the conventional epoxy resin curing agents such as ethylene diamine, diethylene triamine, triethylene tetramine, and tetraethylene pentamine generally effect rapid cure of the resin at room temperatures which would present considerable problems in compounding, storing, and using the partially cured adhesive intermediate products of the present invention so as to require refrigeration.

The following exemplary formulations within the above range illustrate the physical properties obtainable by varying the formulations, the proportions being by weight:

*Example No. 2*

Materials: Composition, parts by weight
Buna-N rubber (including conventional curing agents and accelerators) _____ 90
Fillers, reinforcing agents and/or physical property modifiers _____ 0–200
Epoxide resins _____ 10–200
N,N diallylmelamine, quantity sufficient to react with epoxide groups present in epoxides used.

The foregoing example encompasses the broad range of formulations for structural rubber adhesives of a calenderable extrudable consistency.

*Example No. 3*

Materials: Composition, parts by weight, grams
Buna-N rubber (Hycar 1041) _____ 50
Curing system:
   Zinc oxide (ZnO) _____ 2.5
   Sulfur (S) _____ 0.75
Accelerator (Monex) _____ 0.3
Reinforcing agents (carbon) _____ 40
Epoxide resins (Epon 828) _____ 5.0
N,N diallylmelamine _____ 0.8

This formulation produces a rubbery product capable of being extruded and formed to desired shapes, and exhibiting good resiliency and shock absorbing properties.

*Example No. 4*

Materials: Composition, parts by weight, grams
Buna-N rubber (Hycar 1041) _____ 50
Curing system:
   Zinc oxide _____ 2.5
   Sulfur _____ 0.75
Accelerator (Monex) _____ 0.3
Reinforcing agents (carbon) _____ 50.0
Epoxy resin (Epon 828) _____ 30.0
N,N diallylmelamine _____ 6.0

This formulation produces a rubbery product capable of being extruded and formed to desired shapes, and exhibiting a high order of structural adhesion and bonding and shock absorption.

Of the above formulations for preparing extrudable, calenderable structural rubber adhesive materials, those formulations which contain approximately 25% to 45% by weight buna-N rubber (in the range of 18 to 50% acrylonitrile, preferably about 28 to 38% acrylonitrile content), 15% to 25% epoxide resins of 175 to 210 epoxide equivalency preferably approximately 200 epoxide equivalent and 2.5% to 4.16% N,N diallylmelamine, compounded with 25% to 45% reinforcing agents and physical property modifiers have been found to be best generally suited for use.

For example, structural rubber adhesive tapes and structural rubber adhesive extruded channels have been prepared from the following formulas and have been found to be the most desirable compositions for the present applications:

Example No. 5

| Materials: | Composition, parts by weight, grams |
|---|---|
| Hycar 1041 (rubber) | 1200 |
| N,N diallylmelamine | 125 |
| Epon 828 (epoxide) | 770 |
| Zinc oxide | 60 |
| Sulfur flowers | 18 |
| Monex (accelerator) | 7 |
| Philblack A (carbon) | 1200 |

Example No. 6

| Materials: | Composition, parts by weight, grams |
|---|---|
| Hycar 1041 (rubber) | 1200 |
| N,N diallylmelamine | 91 |
| Epon 828 (epoxide) | 500 |
| Zinc oxide | 60 |
| Sulfur flowers | 18 |
| Monex (accelerator) | 7 |
| Philblack A (carbon) | 700 |

The following will provide some indication of the physical properties of material of our invention made by the above formulas that in columns A and B being the specific properties for the formulations in Examples 5 and 6 respectively:

PHYSICAL PROPERTIES IN "B" STAGE CONDITION

| Original Physical Properties | Formula A | Formula B |
|---|---|---|
| Shore "A" Durometer hardness | 70–75 | 55–60 |
| Modulus at 100% elongation | 530 | 156 |
| Modulus at 300% elongation | 781 | 174 |
| Tensile strength | 781 | 174 |
| Elongation at rupture | 433 | 1300 |

PHYSICAL PROPERTIES AFTER OVEN AGING (70 HOURS AT 158° F.)

| Physical Properties | Formula A | Formula B |
|---|---|---|
| Durometer (Shore "A", 5 seconds) | 90 | 85 |
| Modulus at 100% | 614 | 547 |
| Modulus at 300% | 1,436 | 598 |
| Tensile strength | 1,436 | 598 |
| Elongation at rupture | 344 | 525 |

PHYSICAL PROPERTIES WHEN CURED AT 315° F., 15 MINUTES (UNRESTRICTED)

| | Formula A | Formula B |
|---|---|---|
| Durometer (Shore "A") | 98 | 93 |
| Tensile strength | 1,718 | 1,049 |
| Elongation at rupture | 103 | 163 |
| Specific gravity | 1.279 | 1.1208 |
| Adhesion Data— | | |
| Initial glass to metal adhesion: | | |
| Cured at 250° F., 30 minutes (p.s.i.) | 250 | 130 |
| Cured at 300° F., 20 minutes (p.s.i.) | [1] 1270 | [2] 700 |
| Aged glass to metal adhesion: Aged 10 environmental cycles after curing at 250° F. for 30 minutes [3] (p.s.i.) | [1] 1270 | [2] 800 |

[1] Cohesive failure.
[2] Adhesive failure.
[3] One environmental cycle is defined as follows: 24 hours at 175° F., 24 hours at 100% humidity at 100° F., and 24 hours at −40° F.

Formulations in which part of the carbon in the above formulations has been replaced with organic polymers and plasticizers or fiber type reinforcing agents have been found to alter the handling properties of the product without seriously detracting from the adhesion or strength of it. For example, 1/10 part of either neoprene, butyl rubber, thiokol rubber, or asbestos may be added to a compound containing 1 part buna-N rubber, 1 part carbon, 4/7 part Epon 828, and 5/49 part N,N diallylmelamine to modify the handling characteristics of the compound.

The example below encompasses the broad range of formulations for structural rubber adhesives of a viscous liquid consistency:

Example No. 7

| Materials: | Composition, parts by weight |
|---|---|
| Buna-N rubber (with cure system) | 100 |
| Fillers and reinforcing agents | 0–100 |
| Epoxide resins | 4–2000 |
| N,N diallylmelamine, quantity sufficient to react with all epoxide groups present in epoxide(s) used | 2/3–320 |

As specific examples, viscous liquid consistency materials have been prepared from the following formulations:

Example No. 8

| Materials: | Composition, parts by weight, grams |
|---|---|
| Buna-N rubber (high rubber) | 5.0 |
| Zinc oxide | 0.25 |
| Sulfur | 0.075 |
| Monex (accelerator) | 0.03 |
| Epon 828 | 50.00 |
| N,N diallylmelamine | 8.00 |

Material of this specific composition when cured exhibits good adhesion to metal and glass and good flexibility and shock absorption when employed as a bonding material for said metal and glass.

Example No. 9

| Materials: | Composition, parts by weight, grams |
|---|---|
| Hycar 1041 | 10 |
| Zinc oxide | .5 |
| Sulfur | .15 |
| Monex | .06 |
| Epon 828 | 160 |
| N,N diallylmelamine | 26 |
| Diallyl Phthalate (plasticizer and modifier) | 36 |
| Iso Octyl Decyl Phthalate (plasticizer and modifier) | 30 |

These formulations produce trowelable viscous liquid materials free of solvent which cure to form a firm resilient shock absorbing bonding medium possessing good adhesion to glass and metal surfaces.

As previously noted other curing agents may be used for certain applications with or in place of N,N diallylmelamine. The weight of such substitute employed must be such as to provide approximately the same number of functional or cross linking groups as does the N,N diallylmelamine over the weight range shown in the above general formulation. In all instances where a totally cured resin product is desired it has been found preferable to use approximately a 10% excess of the resin curing agent to obtain the complete resin cure. A typical specific formulation exemplifying this procedure is given below in which we employ triazine triamine as a substitute for the N,N diallylmelamine and in which 10% excess of the triazine triamine has been used:

Example No. 10

| Materials: | Composition, parts by weight, grams |
|---|---|
| Hycar | 100 |
| Carbon Black | 100 |
| Zinc oxide | 5 |
| Sulfur | 1.5 |
| Monex | 0.6 |
| Epon 828 | 61.4 |
| Triazine triamine (Melamine) | 14.0 |

The temperatures necessary to cure this formulation using melamine are considerably higher, e.g. 425° F. to 450° F. than that required when using N,N diallylmelamine and result in considerable scorching of the composition during curing. Precuring of the epoxy resin to the B stage in this temperature range is required before compounding into the rubber system to limit the total extent of scorching upon final cure.

An example of a lower temperature curing agent is the acid salt of melamine which, in its reaction with the epoxy resin, cures through a mechanism typical of that found in acid curing systems in which the epoxy curing is accomplished by cleavage of the epoxide linkage and resultant formation of an alcohol which, upon further reaction with more acid, forms an ester. This curing agent cures slightly in excess of 300° F. but does not cure completely since the acid apparently retards the final rubber cure and the resultant strength is materially impaired. A formulation typically employed for this reaction is as follows:

*Example No. 11*

| Materials: | Composition, parts by weight, grams |
|---|---|
| Hycar 1041 | 100.0 |
| Carbon Black | 100.0 |
| Zinc oxide | 5.0 |
| Sulfur | 1.5 |
| Monex | 0.6 |
| Epon 828 | 61.4 |
| 1 mole Melamine: 9 moles acetic acid | 6.9 |

Since it is difficult to obtain a complete cure of this formulation the fatigue life thereof is markedly less than an adhesive material of the same general composition using N,N diallylmelamine as the curing agent. For example, the following formulation using N,N diallylmelamine as the curing agent exhibits thirty-two times the internal cohesive strength of the above formulation using the acid salt curing agent when both formulations are subjected to the identical vibration fatigue test:

*Example No. 12*

| Materials: | Composition, parts by weight, grams |
|---|---|
| Hycar 1041 | 100.0 |
| Carbon Black | 100.0 |
| Zinc oxide | 5.0 |
| Sulfur | 1.5 |
| Monex | 0.6 |
| Epon 828 | 61.4 |
| N,N diallylmelamine | 10.0 |

The fatigue test is performed at 1800 vibrations per minute with an amplitude of ±0.050 inch.

It is not necessary that the partially cured (B stage) epoxy resin be formed in situ in compounding the elastomeric composition as described above. It may be precured to a partial cure and then incorporated into the rubbery or viscous liquid adhesive composition. It is not necessary that the latter step be taken immediately. The partially cured resin (in viscous or solid state) may be stored and used in its semi-cured form as a thermosettable modifying material in paints, plastics, synthetic fibers, rubber, and for organic formulations in general.

One suitable composition for use as such a modifying material is 77 grams of an epoxide resin having an epoxide equivalent range of approximately 175–200 and 12.5 grams of N,N diallylmelamine. This material may be cured to an intermediate (B stage) cured solid state. However, by varying the percentage of N,N diallylmelamine and the curing time and temperature, the consistency and degree of cure of this type material may be widely varied.

This intermediate basic resinous material may be prepared by blending the N,N diallylmelamine with epoxide resins and mixing and heating this blend until a transparent solution results. A heat built up rate of the blend of 20–30° F. rise per minute has been successfully used to bring about solubility of the N,N diallylmelamine in the resin. The blend begins to develop an almost imperceptible exotherm at about 230° F. which progresses in intensity as the temperature rises until the temperature of approximately 310–312° F. is obtained. At or about this temperature the exotherm rate suddenly increases and the temperature of the blend must thereafter be carefully controlled to prevent such a degree of cross linking of the resin as to render the product essentially thermoset and unusable as a thermosettable additive material or adhesive. A useful semi-cured additive adhesive material has been obtained by controlling the temperature of a blend of 770 grams of epoxide resin of 175–200 epoxide equivalent and 125 grams of N,N diallylmelamine at 305–310° F. for 30 minutes and then rapidly cooling.

A typical and preferable procedure for compounding the above extrudable formulations, for instance those of Examples 2 to 6 is as follows:

The buna-N rubber is broken down in a Banbury mixer until the material attains a temperature of approximately 120° F. The zinc oxide and sulfur are then added and mixing continued in the Banbury. One-third of the resin component which has been previously heated to a temperature of approximately 120° F. is now added and followed immediately with a third of the carbon black and the entire batch mixed for approximately one minute, one-half of the remaining resin component and one-half of the remaining carbon black is then added and mixing continued. The temperature at this point, after mixing, should be between 150° F. and 175° F. The remainder of the carbon black and resin component is added and mixing continued. The temperature at this point after mixing should be approximately 200° F. The full quantities of Monex and N,N diallylmelamine are then added to the batch and mixing continued at a rate and with cooling of the rolls to give a temperature rise of approximately 20° F. per 90 seconds until a temperature of 260–270° F. is attained. The total mixing time should be approximately 12 minutes. During this mixing the curing agent becomes dissolved in the epoxy resin and advances cure of the resin to the B stage. The material is immediately dumped and sheeted out on a cool mill at a thickness of approximately one-quarter inch. The elapsed time from Banbury to mill should be about two minutes. Care should be exercised to insure that the large mass from the Banbury is immediately sheeted so that an exotherm heat does not develop which would advance the degree of resin cure to a degree (C stage) rendering the mass unsuitable for further use as an intermediate cured material. Greater thickness than one-quarter inch of the sheeted material allows premature exothermic heat build-up within the material and results in premature cure and undesirable bonding characteristics. After or during sheeting, the material should be thoroughly cooled as quickly as possible.

When a harder material still in the B stage is required for a particular application, such as in assemblies wherein the bond is subjected to heavier than normal loads, this material can be easily obtained by allowing the temperature in the Banbury to rise to 290° F. prior to dumping. However, caution must be exercised in dissipating the heat of the mass as quickly as possible on a cold mill, sheeting off, and cooling the material to room temperature in thin sections as rapidly as possible prior to storage. In subsequent processing such as extrusion, the temperature of the material mass in the equipment should be held to a maximum of 225° F. Presently the most convenient method of controlling the hardness of the two materials consists of checking the Shore A Durometer hardness of the uncured stock. For the best results, the hardness of the soft material should be held between 40 and 65 Shore A Durometer reading preferably 40–60 for high impact material. The hardness limits for the harder material are 70 to 75 Shore A Durometer reading. These limits are based on reading the durometer gauge five seconds after it is applied.

In order to check the composition as it comes from the mill before calendering but after sheeting to be sure that its cure has not advanced beyond the B stage resort may be had to the Mooney "scorch test" covered in ASTM Procedure D–1077. In this test a sample of the sheeted material is tested on a Mooney Viscosimeter or Plastometer using the small rotor at a temperature of 250° F. A satisfactory material will show a maximum rise of 10 points in 22 to 30 minutes. The lesser this number the more stable the material i.e., the less it has advanced toward the C stage.

In the drawings illustrating certain applications of the composition of our invention and wherein like numerals in the several figures represent the same element:

FIGURE 1 represents a view partly in section of a conventional pivoted front vent window of an automobile to which our invention has specifically been applied;

FIGURE 2 represents a cross sectional view taken along line 2—2 of FIGURE 1;

FIGURE 3 represents a plan view of the bonding medium of our invention in flat strip form for use in the construction of FIGURES 1 and 2;

FIGURE 4 represents an end view of the strip of FIGURE 3;

FIGURE 5 represents an intermediate stage in the process of assembling the bonding strip of FIGURE 3 between the glass and channel of the window structure of FIGURE 2;

FIGURE 6 shows the parts of FIGURE 5 completely assembled;

FIGURE 7 represents a side elevational view of a rear window assembly of an automobile embodying the present invention;

FIGURE 8 represents a cross sectional view of the assembly of FIGURE 7 taken along line 8—8 of FIGURE 7;

FIGURE 9 is an isometric view of a preformed extruded adhesive channel member of the composition of our invention such as may be used in the FIGURE 8 structure;

FIGURE 10 represents different stages in a modification of the fabrication of the adhesive channel member of FIGURE 9;

FIGURE 11 represents different stages in the making of a joint using an adhesive channel member of the general character shown in FIGURE 9;

FIGURE 12 represents stages in the joining of two channel members using a modified form of joint; and FIGURE 13 represents a top view of the joined members of FIGURE 12.

As shown in the drawings, our invention is particularly applicable to pivoted automotive vent window assemblies such as that shown in FIGURE 1 where the glass window 20 is to be adhesively and securely bonded to the walls of a metal channel pivot member 22 which only partially encompasses the periphery of the window. A bonding layer or member 24 of the composition of our invention, for example, such as Formula No. 1 above in an uncured preformed sheet of the form shown in FIGURES 3 and 4, is preferably assembled with the channel as shown in FIGURES 5 and 6. In assembling 20, 22, and 24 together, member 24 is bent into substantially a channel member along dotted lines 26 (FIGURE 3) and conformed about the bottom edge 28 of the window. The window and bonding member 24 applied thereto are fractionally inserted into channel 22 in a manner shown in FIGURES 5 and 6 and subjected subsequently to a temperature sufficient to cure member 24 and securely adhesively bond it to window 20 and channel 22 but not sufficient to distort the channel member or injure the finish thereof or the window. The adhesive bond between member 22 and glass 20 is sufficiently strong to eliminate the need for a metal channel member completely encompassing the periphery of the window. The glass 20 becomes, when so bonded, a structural substitute for the metal frame and is connected to the pivotal mounting 23 through members 24 and 22.

In FIGURES 7 and 8 is shown an assembly of a rear window panel 30 of laminated glass, a metal channel 32, and an adhesive strip 34 of a preformed shape shown in FIGURE 9 and having an extrudable composition such as that of member 24. This assembly is locked in place within framework 36 defining the window opening in the car body. Should any bends and joints have to be made in the adhesive member to conform it to a window such as 30, the single tab joint of FIGURE 11, or the double tab joint of FIGURE 12 may be employed to make the join. Moreover, corner bends may conveniently be made by notching as shown in FIGURES 10 and 13. In such an assembly, the bonde between glass 30 and channel 32 is so strong as to impart structural support and load carrying functions to the glass. Heretofore, such glass actually floated in the channels and so long as a proper fluid seal was present around its periphery its supporting function was not of importance. By the use of the adhesive bond of this invention, however, structural supporting and load carrying functions can be readily expected of such window constructions.

Referring specifically to FIGURE 10, an adhesive strip 38 of material having a suitable composition such as that of Formula No. 1 above is extruded or sheeted into a flat strip form which may then be notched at 40 and bent along dotted lines 42 to produce a notched channel member 44 which may then be bent into an angle channel member and held in this shape while being assembled into a frame of the same shape to conform to a corner of a window to produce an assembly such as that of FIGURES 7 and 8.

Referring to FIGURE 11, an adhesive channel member 46 may be provided with a splicing or welding tab 48 by cutting away portions of the adjacent sides 49, and said tab 48 and an adjacent bottom portion 50 of another channel member 52 may then be plastically welded or fused together by a suitable heated die set or plier tool or other means which can provide heat to portions 48 and 50 simultaneously with pressing these portions together. The fused joint can be made by two splicing or welding tabs on a corner portion of the adhesive channel as shown in FIGURE 12 wherein tabs 54 and 56 are overlapped and plastically welded to produce joint 58. The plastic welding of the splicing tabs is best carried out by using relatively cool dielectric heating electrodes carrying alternating high frequency current (e.g. 27–32 megacycles) directed through the tab areas to be spliced or welded. This type of high frequency heating avoids excessive heating and deformation of the channel members. The maximum allowable welding temperature should be low enough for the particular composition used to avoid complete curing of the overlapped tab portions. For example, for a composition of the Formula No. 5 above, the welding temperature should be about 300° F.

It is not desired that the disclosure of particular structure embodying specific applications of the present invention limit applicants' invention since the invention is believed to have broad and novel application as aforesaid.

We claim:

1. A thermosetting elastomeric composition for use as a bonding material for metal, glass and structural members thereof, comprising a substantially tack free to tacky blend containing as essential constituents a synthetic rubber component selected from copolymers of acrylonitrile and butadiene having an acrylonitrile content between about 18 to 50 percent by weight, and a copolymer of ethyl acrylate and chloroethyl vinyl ether having a chloroethyl vinyl ether content of more than 2 percent and less than 10 percent by weight, a polyepoxide resin which is the reaction product of epichlorohydrin and a polyhydroxy organic compound selected from the group consisting of bis-, tris-, and tetrakis-glycidal ethers and an amine epoxide curing agent selected from the group consisting of N,N diallylmelamine, triazine triamine and the acid salts thereof, alkyl substituted triazine triamines and the acid salts thereof, cyanoethylated alkyl amines and the acid salts thereof, cyanoethylated alkyl substituted triazine triamines and the acid salts thereof, N,N' diallylmelamine, and unsaturated alkyl and polyalkyl derivatives of melamine, which agent is in solution with said resin and partially reacted therewith such that said resin is in the B stage of cure, said composition containing in parts by weight for every 100 parts of polyepoxide resin between about 6 to 240 parts by weight of rubber component and about 11 to 20 parts of curing agent and said composition being characterized by the presence of phenolic resin in amount up to but not more than 25% by weight of the total resin content thereof and said material being characterized by latent thermosetting properties during final cure of the epoxide resin to the C stage whereby the material passes through a thermoplastic state accompanied by strong adhesiveness to effect a bond and said material when bonding metal with glass inhibiting shatter of the glass due to stress transfer during substantial temperature fluctuations.

2. A thermosetting elastomeric composition for use as a bonding material for metal, glass and structural members thereof, comprising a substantially tack free to tacky blend containing as essential constituents a synthetic rubber component selected from copolymers of acrylonitrile and butadiene having an acrylonitrile content between about 18 to 50 percent by weight, and a copolymer of ethyl acrylate and chloroethyl vinyl ether having a chloroethyl vinyl ether content of more than 2 percent and less than 10 percent by weight, a polyepoxide resin which is the reaction product of epichlorohydrin and a polyhydroxy organic compound selected from the group consisting of bis-, tris-, and tetrakis-glycidal esters and an amine epoxide curing agent selected from the group consisting of N,N diallylmelamine, triazine triamine and the acid salts thereof, alkyl substituted triazine triamines and the acid salts thereof, cyanoethylated alkyl amines and the acid salts thereof, cyanoethylated alkyl substituted triazine triamines and the acid salts thereof, N,N' diallylmelamine, and unsaturated alkyl and polyalkyl derivatives of melamine, which agent is in solution with said resin and partially reacted therewith such that said resin is in the B stage of cure, said composition containing in parts by weight for every 5 to 100 parts of rubber component, about 200 to 5 parts of epoxide resin and at least about 0.8 part by weight of curing agent, and sufficient to react with all the epoxide groups of such resin, and said composition being characterized by the presence of phenolic resin in amount up to but not more than 25% by weight of the total resin content thereof, and said material being characterized by latent thermosetting properties during final cure of the epoxide resin to the C stage whereby the material passes through a thermoplastic state accompanied by strong adhesiveness to effect a bond and said material when bonding metal with glass inhibiting shatter of the glass due to stress transfer during substantial temperature fluctuations.

3. A thermosetting elastomeric composition for use as a bonding material for metal, glass and structural members thereof, comprising a substantially tack free to tacky blend containing as essential constituents a synthetic rubber component selected from copolymers of acrylonitrile and butadiene having an acrylonitrile content between about 18 to 50 percent by weight, and a copolymer of ethyl acrylate and chloroethyl vinyl ether having a chloroethyl vinyl ether content of more than 2 percent and less than 10 percent by weight, a polyepoxide resin which is the reaction product of epichlorohydrin and a polyhydroxy organic compound selected from the group consisting of bis-, tris-, and tetrakis-glycidal ethers and an amine epoxide curing agent selected from the group consisting of N,N diallylmelamine, triazine triamine and the acid salts thereof, alkyl substituted triazine triamines and the acid salts thereof, cyanoethylated alkyl amines and the acid salts thereof, cyanoethylated alkyl substituted triazine triamines and the acid salts thereof, N,N' diallylmelamine, and unsaturated alkyl and polyalkyl derivatives of melamine, which agent is in solution with said resin and partially reacted therewith such that said resin is in the B stage of cure, said composition containing in parts by weight for every 5 to 100 parts of rubber component about 100 to 5 parts of epoxide resin, and about 15 to 0.8 parts by weight of curing agent, said curing agent being sufficient in amount to react with all the epoxide groups of such resin and said composition being characterized by the presence of phenolic resin in amount up to but not more than 25% by weight of the total resin content thereof, and said material being characterized by latent thermosetting properties during final cure of the epoxide resin to the C stage whereby the material passes through a thermoplastic state accompanied by strong adhesiveness to affect a bond and said material when bonding metal with glass inhibiting shatter of the glass due to stress transfer during substantial temperature fluctuations.

4. A thermosetting elastomeric composition for use as a bonding material for metal, glass and structural members thereof, comprising a substantially tack free to tacky blend containing as essential constituents a synthetic rubber component selected from copolymers of acrylonitrile and butadiene having an acrylonitrile content between about 18 to 50 percent by weight, and a copolymer of ethyl acrylate and chloroethyl vinyl ether having a chloroethyl vinyl ether content of more than 2 percent and less than 10 percent by weight, a polyepoxide resin which is the reaction product of epichlorohydrin and a polyhydroxy organic compound selected from the group consisting of bis-, tris-, and tetrakis-glycidal ethers and an amine epoxide curing agent selected from the group consisting of N,N diallylmelamine, triazine triamine and the acid salts thereof, alkyl substituted triazine triamines and the acid salts thereof, cyanoethylated alkyl amines and the acid salts thereof, cyanoethylated alkyl substituted triazine triamines and the acid salts thereof, N,N' diallylmelamine, and unsaturated alkyl and polyalkyl derivatives of melamine, which agent is in solution with said resin and partially reacted therewith such that said resin is in the B stage of cure, said composition containing in parts by weight for each 90 parts of rubber component, between about 10 to 200 parts of epoxide resin, and curing agent in amount sufficient to react stoichiometrically with approximately all reactive epoxide groups of the epoxide resin, and said composition being characterized by the presence of phenolic resin in amount up to but not more than 25% by weight of the total resin content thereof, and said material being characterized by latent thermosetting properties during final cure of the resin to the C stage whereby the material passes through a thermoplastic state accompanied by strong adhesiveness to effect a bond and said material when bonding metal with glass inhibiting shatter of the glass due to stress transfer during substantial temperature fluctuations.

5. A thermosetting elastomeric composition for preparing substantially tack free room temperature calenderable material for bonding metal, glass and structural members thereof, comprising a blend containing as essential constituents a synthetic rubber component selected from copolymers of acrylonitrile and butadiene having an acrylonitrile content between about 18 to 50 percent by weight, a polyepoxide resin which is the reaction product of epicholohydrin and a polyhydroxy organic compound selected from the group consisting of bis-, tris-, and tetrakis-glycidal ethers and an amine epoxide curing agent essentially consisting of N,N-diallylmelamine, in solution with said resin and partially reacted therewith, said resin being in the B stage of cure, said composition containing in parts by weight for each 90 parts of rubber component between about 10 to 200 parts of epoxide resin and curing agent in amount sufficient to react stoichiometrically with approximately all reactive epoxide groups of the epoxide resin, and said composition being characterized by the presence of phenolic resin in amount up to but not more than 25% by weight of the total resin content thereof, and said material being characterized by latent thermosetting properties during final cure of the resin to the C stage whereby the material passes through a thermoplastic state accompanied by strong adhesiveness to effect a bond and said material when bonding metal with glass inhibiting shatter of the glass due to stress transfer during wide temperature fluctuations between about −40° F. to 375° F.

6. A thermosetting elastomeric composition for preparing substantially tack free room temperature calenderable material for bonding metal, glass and structural members thereof, comprising a blend containing as essential constituents a synthetic rubber component selected from copolymers of acrylonitrile and butadiene having an acrylonitrile content between about 18 to 50 percent by weight, a polyepoxide resin having an epoxy equivalency of between about 175 to 210 which is the reaction product of epichlorohydrin and a polyhydroxy organic compound selected from the group consisting of bis-, tris-, and tetrakis glycidal ethers and an amine epoxide curing agent essentially consisting of N,N-diallylmelamine, in solution with said resin and partially reacted therewith, said resin being in the B stage of cure, and additive components selected from fillers, reinforcing agents, plasticizers, pigments and anti-oxidants, said components being present in the following proportions in percent weight of the blend:

| | Percent |
|---|---|
| Rubber component | 25 to 45 |
| Epoxy resin | 15 to 25 |
| Curing agent | 2.5 to 4.16 |
| Additives | 25 to 45 | said composition being characterized by the presence of a phenolic resin in amount up to but not more than 25% by weight of the total resin content thereof, and said material being characterized by latent thermosetting properties during final cure of the resin to the C stage whereby the material passes through a thermoplastic state accompanied by strong adhesiveness to affect a bond and said material when bonding metal with glass inhibiting shatter of the glass due to stress transfer during wide temperature fluctuations between −40° F. to 375° F.

7. The elastomeric composition as claimed in claim 5 in the form of a substantially flat substantially tack-free flexible strip capable of being formed to a predetermined configuration at room temperature and capable of good shelf life.

8. The elastomeric composition as claimed in claim 7 including up to 200 parts of physical property modifiers selected from the group consisting of fillers, reinforcing agents, plasticizers, pigments and anti-oxidants.

9. The elastomeric material as claimed in claim 2 which is further characterized by a rubber component that includes a sulfur curing agent and by filler material in amount up to about twice the weight of the combined rubber component, epoxy resin and resin curing agents.

10. The elastomeric composition as claimed in claim 3 including up to 210 parts by weight of physical property modifiers selected from the group consisting of fillers, reinforcing agents, plasticizers, pigments and anti-oxidants.

11. A thermosetting extrudable elastomeric composition for use as a bonding material for metal, glass and structural members thereof comprising a substantially homogeneous blend containing in parts by weight about 50 parts of butadiene-acrylonitrile rubber having an acrylonitrile content of about 43 percent, about 2.5 parts zinc oxide, about 0.75 part sulfur, about 0.3 part tetramethylthiuram monosulfide, about 50 parts of carbon black, about 30 parts of an epoxy resin which is the reaction product of epicholorohydrin and bisphenol A and about 6.0 parts of N,N diallylmelamine, said composition being characterized by the presence of phenolic resin in amount up to but not more than 25% by weight of the total resin content thereof, and said material being characterized by latent thermosetting properties during final cure of the resin to the C stage whereby the composition passes through a thermoplastic state accompanied by strong adhesiveness to effect a bond and said material when bonding metal with glass inhibiting shatter of the glass due to stress transfer during substantial temperature fluctuations between −40 F. to 375° F.

12. A thermosetting extrudable elastomeric composition for use as a bonding material for metal, glass and structural members thereof comprising a substantially homogeneous blend containing in parts by weight about 1200 parts of butadiene-acrylonitrile rubber having an acrylonitrile content of about 43 percent, about 60 parts zinc oxide, about 18 parts sulfur, about 7 parts tetramethylthiuram monosulfide, about 700 parts of carbon black, about 500 parts of an epoxy resin which is the reaction product of epichlorohydrin and bisphenol A and about 91 parts of N,N diallylmelamine, said composition being characterized by the presence of phenolic resin in amount up to but not more than 25% by weight of the total resin content thereof, and said material being characterized by latent thermosetting properties during final cure of the resin to the C stage whereby the composition passes through a thermoplastic state accompanied by strong adhesiveness to effect a bond and said material when bonding metal with glass inhibiting shatter of the glass due to stress transfer during substantial temperature fluctuations between −40° F. to 375° F.

13. A thermosetting extrudable elastomeric composition for use as a bonding material for metal, glass and structural members thereof comprising a substantially homogeneous blend containing in parts by weight about 100 parts of butadiene acrylonitrile rubber having an acrylonitrile content of about 43 percent, about 5 parts zinc oxide, about 1.5 parts sulfur, about 0.6 part tetramethylthiuram monosulfide, about 100 parts of carbon black, about 61.4 parts of an epoxy resin which is the reaction product of epichlorohydrin and bisphenol A and about 10 parts of N,N diallylmelamine, said composition being characterized by the presence of phenolic resin in amount up to but not more than 25% by weight of the total resin content thereof, and said material being characterized by latent thermosetting properties during final cure of the resin to the C stage whereby the composition passes through a thermoplastic state accompanied by strong adhesiveness to effect a bond and said material when bonding metal with glass inhibiting shatter of the glass due to stress transfer during substantial temperature fluctuations between −40° F. to 375° F.

14. A process of compounding an elastomeric extrudable material for use as a bonding medium for metal, glass and structural members thereof, comprising providing a rubber component selected from copolymers of acrylonitrile and butadiene having an acrylonitrile content between about 18 to 50% by weight and a copolymer of ethyl acrylate and chloroethyl vinyl ether having a chloroethyl vinyl ether content of more than 2 percent and less than 10 percent by weight, a polyepoxide resin which is the reaction product of epichlorohydrin and a polyhydroxy organic compound selected from the group consisting of bis-, tris-, and tetrakis-glycidal ethers and an amine epoxide curing agent selected from the group consisting of N,N diallylmelamine, triazine triamine and the acid salts thereof, alkyl substituted triazine triamines and the acid salts thereof, cyanoethylated alkyl amines and the acid salts thereof, cyanoethylated alkyl substituted triazine triamines and the acid salts thereof, N,N' diallylmelamine and unsaturated alkyl and polyalkyl derivatives of melamine, subjecting at least said curing agent and resin to a temperature rise sufficiently above room temperature to cause the amine epoxide curing agent to react and go into solution with said epoxide resin and effect advancement of the resin to the B stage of cure, working the rubber and resin into a substantially homogeneous composition while controlling the temperature rise of the mixture to a temperature under about 350° F., and then cooling the composition to about room temperature whereby to produce a material characterized by latent thermosetting properties and which when subjected to reheating to effect final cure of the resin to the C stage passes through a thermoplastic state accompanied by strong adhesiveness to effect a bond and which cured material when bonding metal with glass will substantially inhibit shatter of the glass due to stress transfer during substantial temperature fluctuations, said composition containing in parts by weight for every 100 parts of polyepoxide resin between about 6 to 240 parts of rubber component and about 11 to 20 parts of curing agent and said composition being characterized by the presence of phenolic resin in amount up to but not more than 25% by weight of the total resin content thereof.

15. A process of compounding an elastomeric extrudable material for use as a bonding medium for metal, glass and structural members thereof, comprising blending a rubber component selected from copolymers of acrylonitrile and butadiene having an acrylonitrile content between about 18 to 50% by weight and a copolymer of ethyl acrylate and chloroethyl vinyl ether having a chloroethyl vinyl ether content of more than 2 percent and less than 10 percent by weight with a polyepoxide resin which is the reaction product of epichlorohydrin and a polyhydroxy organic compound selected from the group consisting of bis-, tris-, and tetrakis-glycidal ethers and an amine epoxide curing agent selected from the group consisting of N,N diallylmelamine, the acid salts of triazine triamine, acid salts of alkyl substituted triazine triamines, cyanoethylated alkyl amines and the acid salts thereof, acid salts of cyanoethylated alkyl substituted triazine triamines and the unsaturated alkyl and polyalkyl derivatives of melamine, working said mixture and raising its temperature sufficiently above room temperature but not above about 310° F. to cause the amine epoxide curing agent to go into solution and react with said epoxide resin and advance the resin to the B stage of cure and then cooling the composition to a temperature inhibiting subsequent exothermic reaction in the mass and cure of the resin to the C stage, whereby to produce an extrudable material characterized by latent thermosetting properties during final cure of the resin to the C stage whereby the material passes through a thermoplastic state accompanied by strong adhesiveness to effect a bond and whereby said cured material when bonding metal with glass will substantially inhibit shatter of the glass due to stress transfer during substantial temperature fluctuations and characterized further by the ability to cure to the C stage at a temperature up to about 350° F. without deleterious scorching of the rubber, said composition containing in parts by weight for each 90 parts of rubber component between about 10 to 200 parts of epoxide resin and curing agent in amount sufficient to react stoichiometrically with approximately all reactive epoxide groups of the epoxide resin and said composition being characterized by the presence of phenolic resin in amount up to but not more than 25% by weight of the total resin content thereof.

16. A process of compounding an elastomeric extrudable material for use as a bonding medium for metal, glass and structural members thereof, comprising blending a rubber component selected from copolymers of acrylonitrile and butadiene having an acrylonitrile content between about 18 to 50% by weight and a copolymer of ethyl acrylate and chloroethyl vinyl ether having a chloroethyl vinyl ether content of more than 2 percent and less than 10 percent by weight with a polyepoxide resin which is the reaction product of epicholorhydrin and a polyhydroxy organic compound selected from the group consisting of bis-, tris-, and tetrakis-glycidal ethers and an amine epoxide curing agent selected from the group consisting of N,N diallylmelamine, the acid salts of triazine triamine, the acid salts of alkyl substitute triazine triamines, cyanoethylated alkyl amines and the acid salts thereof, the acid salts of cyanoethylated alkyl substituted triazine triamines and the unsaturated alkyl and polyalkyl derivatives of melamine, working said mixture and raising its temperature sufficiently above room temperature but not above about 290° F. to cause the amine epoxide curing agent to go into solution and react with said epoxide resin and produce a composition wherein the resin has advanced to the B stage of cure, said composition being then substantially tacky, and then cooling the composition to a temperature inhibiting subsequent exothermic reaction in the mass and cure of the resin to the C stage, whereby to produce a substantially non-tacky material, and working said material into sheet form at a temperature under about 225° F., said material being non-tacky and being characterized by latent thermosetting properties during final cure of the resin to the C stage whereby the material passes through a thermoplastic state accompanied by strong adhesiveness to effect a bond and whereby said cured material when bonding metal with glass will substantially inhibit shatter of the glass due to stress transfer during substantial temperature fluctuations, said composition containing in parts by weight for each 90 parts of rubber component between about 10 to 200 parts of epoxide resin and curing agent in amount sufficient to react stoichiometrically with approximately all reacting epoxide groups of the epoxide resin and said composition being characterized by the presence of phenolic resin in amount up to but not more than 25% by weight of the total resin content thereof.

17. The process as claimed in claim 16, wherein the curing agent is N,N diallylmelamine, and the cured material will substantially inhibit shatter of the glass due to stress transfer during wide temperature fluctuations between about −40° F. to 375° F.

18. The process as claimed in claim 14 wherein the epoxide resin and amine curing agent are mixed and separately heated to a temperature sufficient to advance the epoxide resin to the B stage of cure and immediately cooled and then blended with the rubber component.

19. The elastomeric material as claimed in claim 5, wherein the molecular proportion of N,N diallylmelamine to reactive expoxide groups of the resin is in the order of about 1:4.

20. The elastomeric material as claimed in claim 5 wherein the stated ingredients are present in the following amounts in parts by weight (a) Rubber _____ 9.6 to 14.8
(b) Polyepoxide resin _____ About 6
(c) N,N diallylmelamine _____ about 1

21. The elastomeric material as claimed in claim 5 wherein the polyepoxide resin is the reaction product of epicholorhydrin and 2,2'-bis(4-hydroxyphenyl)-propane.

22. The elastomeric material as claimed in claim 6 wherein the rubber is a copolymer of acrylonitrile and butadiene in which the acrylonitrile content is between about 28 to 38% by weight.

(References on following page)

References Cited

UNITED STATES PATENTS

| | | | |
|---|---|---|---|
| 2,288,329 | 6/1942 | Smith | 52—400 |
| 2,744,845 | 5/1956 | Rudoff | 161—185 |
| 2,765,249 | 10/1956 | Sillars | 156—304 |
| 2,789,932 | 4/1957 | Yaeger | 161—185 |
| 2,853,748 | 9/1958 | Kessler | 52—400 |
| 2,858,291 | 10/1958 | McAdam | 260—837 |
| 2,879,252 | 3/1959 | Been et al. | 260—837 |
| 2,920,990 | 1/1960 | Been et al. | 260—837 |
| 2,928,808 | 3/1960 | Belanger | 260—47 |
| 2,965,530 | 10/1960 | Stammetal | 156—293 |
| 2,991,213 | 7/1961 | Williams | 156—304 |
| 3,030,247 | 3/1962 | Schurb. | |
| 3,023,190 | 2/1962 | Damusis | 260—47 |
| 3,070,571 | 12/1962 | Naylor | 260—41.5 |
| 3,087,906 | 4/1963 | Abbott | 260—41.5 |
| 3,168,425 | 2/1965 | Wiplinger | 156—293 |
| 3,171,821 | 3/1965 | Sherman et al. | 260—3 |

MORRIS LIEBMAN, *Primary Examiner.*

A. LIEBERMAN, *Assistant Examiner.*